US008882047B2

(12) United States Patent
Maiboroda

(10) Patent No.: US 8,882,047 B2
(45) Date of Patent: Nov. 11, 2014

(54) METHOD AND SYSTEM FOR DELIVERING CARGOES INTO SPACE

(76) Inventor: Alexander Olegovich Maiboroda, Rostov-na-Donu (RU)

( * ) Notice: Subject to any disclaimer, the term of this patent is extended or adjusted under 35 U.S.C. 154(b) by 589 days.

(21) Appl. No.: 13/144,275

(22) PCT Filed: Feb. 2, 2010

(86) PCT No.: PCT/RU2010/000036
§ 371 (c)(1),
(2), (4) Date: Jul. 12, 2011

(87) PCT Pub. No.: WO2010/082869
PCT Pub. Date: Jul. 22, 2010

(65) Prior Publication Data
US 2011/0272528 A1    Nov. 10, 2011

(30) Foreign Application Priority Data
Jan. 13, 2009 (RU) ................................ 2009100935

(51) Int. Cl.
*B64G 1/10* (2006.01)
*B64G 1/40* (2006.01)
*B64G 1/00* (2006.01)
*B64G 1/64* (2006.01)

(52) U.S. Cl.
CPC .............. *B64G 1/1078* (2013.01); *B64G 1/002* (2013.01); *B64G 1/40* (2013.01); *B64G 1/648* (2013.01)
USPC .................. 244/158.5; 244/171.1; 244/172.2; 244/172.4

(58) Field of Classification Search
CPC .... B64G 1/10; B64G 1/1085; B64G 1/10789; B64G 1/409
USPC .......... 244/158.1, 158.2, 158.5, 171.1, 172.2, 244/172.4, 172.7
See application file for complete search history.

(56) References Cited

U.S. PATENT DOCUMENTS

| 3,818,700 | A | * | 6/1974 | Kantrowitz et al. ............. 244/74 |
| 4,775,120 | A | | 10/1988 | Marwick |
| 5,224,663 | A | * | 7/1993 | Criswell ........................ 244/1 R |
| 8,251,315 | B2 | * | 8/2012 | Leyre .......................... 244/158.4 |

OTHER PUBLICATIONS

A.Shibanov "The Concerns of a Space Architect"—M.: Detskaya Literatura, 1982, p. 35-39. Attention, Energy Overboard! (Extract and English translation of Extract enclosed).
Andreev, A.V. "Some Issues on Lunar Substance Transportation" Proceedings from Readings XIX by K. E. Tsiolkovsky. Section "The Problems of Rocket and Space Engineering".—M.:IIET, An USSR, 1986, p. 87-96; (Extract and English translation of Extract enclosed).

(Continued)

*Primary Examiner* — Rob Swiatek
(74) *Attorney, Agent, or Firm* — Volpe and Koenig, P.C.

(57) ABSTRACT

A method and respective system for delivering cargoes into space by means of preliminary launching cargoes and then capturing cargoes by at least one container spacecraft, accumulating and further transferring to other spacecrafts, wherein the container spacecraft is designed for capturing cargoes as separate portions in the form of a cloud or stream as well as for use of a propulsion system to compensate for container spacecraft speed losses caused by the cargo capture and an aerodynamic drag, wherein the propulsion system being a reactive type with consumption of a part of the incoming cargoes as a working substance.

5 Claims, 1 Drawing Sheet

(56) References Cited

OTHER PUBLICATIONS

Lebon, Benoit A. "Magnetic Propulsion Along an Orbiting Grain Stream", J. Spacecraft, vol. 23, No. 2, Mar.-Apr. 1986, pp. 141-143.
Florov, V.I. The researcher of the CNIImash, "The Future of the Earth and the Mankind: The Role and the Place of Astronautics" (Extract and English translation of Extract enclosed).
Gatland, Kenneth "The Illustrated Encyclopedia of Space Technology", Translation from English, M., MIR, 1986 (Extract and English translation of Extract enclosed).
Eskov, J.M. "Environmentally Safe Global Power Industry and Astronautics in the XXIth Century", 2004, pp. 1-168; (Extracts and English Translation of Extracts, pp. 41-45 and 137 enclosed).

* cited by examiner

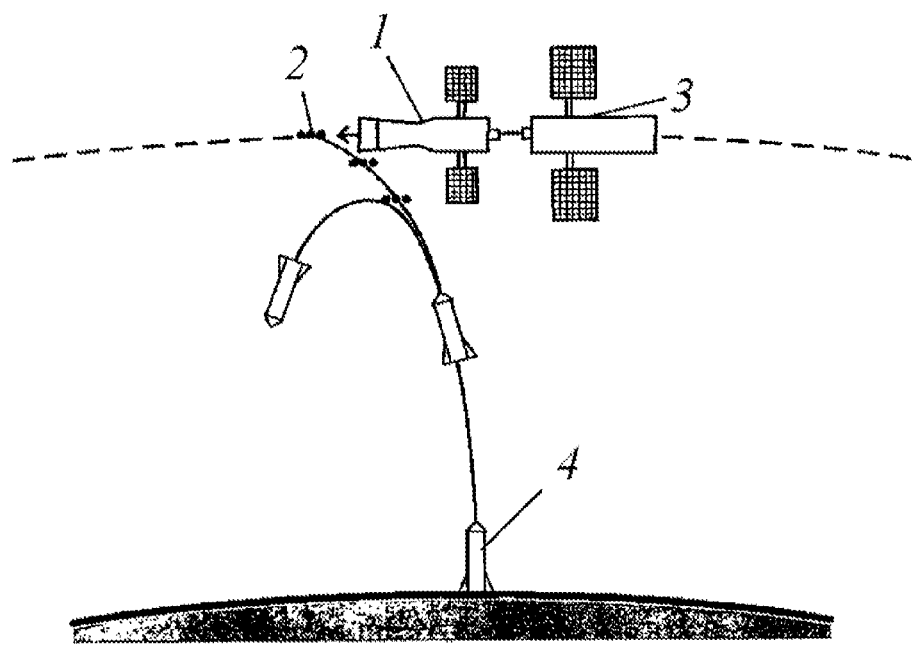
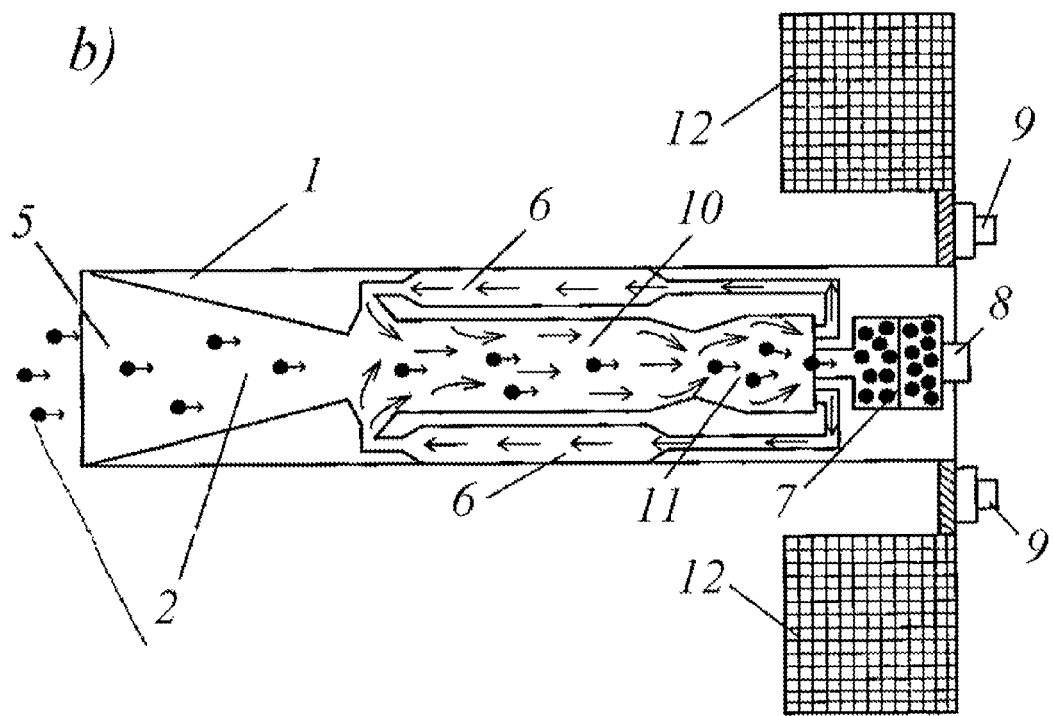

METHOD AND SYSTEM FOR DELIVERING CARGOES INTO SPACE

FIELD OF INVENTION

The invention relates to rocket production and astronautics, in particular to space transportation systems, especially, to methods and systems for delivering cargoes into a near-earth orbit.

BACKGROUND

An urgent problem for astronautics is still substantial reduction of specific costs of delivering cargoes into space—embodiment of many technologically feasible and important space projects is postponed because of unacceptable cargo transportation prices. A high price of cargo transportation from the Earth into cosmic space is generally caused by the fact that fuel makes up the greater part of rockets' cargo while the proportion of net cargo is measured by several percents. There were expressed different proposals on development of methods and systems aimed at solution of the problem of reduction in the price of delivering cargoes into space.

In judgment of some specialists, this problem may be obviated if energy and raw material resources of space itself, including those of near-earth space, are used for transportation of cargoes into space. There are two directions.

One of them consists in reduction of expenses in delivering cargoes into a near-earth orbit due to application of a suborbital single-stage rocket with small fuel consumption per one unit of mass of a cargo and an orbital accelerating spacecraft. A rocket imparts only a part of a speed necessary to insert the cargo into an orbit while the orbital accelerating spacecraft imparts a full orbital speed to the cargo. An orbital-based stage approaches a ground-based suborbital accelerating stage after preliminary aerodynamical braking and partial loss of the speed, and, after receiving the cargo, speeds up to the orbital speed again using a cheap fuel produced on moon factories (J. M. Es'kov, Environmentally Safe Global Power Industry and Astronautics in XXI Century//Moscow: "Trinitarizm Academy", El 77-6567, publication 14590, Mar. 10, 2007; V. I. Florov, The Future of the Earth and Mankind: Role and Place of Astronautics//http://n113m.narod.ru/galaktika/florov.htm).

The essence of another direction consists in that the cargo (fuel components in our case) is taken directly from the atmosphere. At the same time, the method used for speeding the fuel components up to an orbital speed consists in transfer of necessary kinetic energy to accelerated gasses directly on board an orbit-based spacecraft. Such spacecrafts are provided with an electric rocket propulsion system where the speed of working substance outflow exceeds the speed of the incoming working substance. Thus, a high proportion of net load is provided in the total mass due to a small proportion of substances consumed in the electric rocket propulsion system. The necessary raw materials for rocket fuel components are extracted directly in the orbit from the atmosphere of a planet, e.g. the Earth, by low-orbit container spacecrafts (CSCs). Capture and accumulation of raw materials is performed as follows. The CSC moves within the atmosphere in a low near-earth orbit at an altitude of 105 to 120 km and collects rarefied air while extracting oxygen from it and using the remaining nitrogen in an electric jet engine to provide compensation for aerodynamic drag loss.

The project PROFAC (PROpulsive Fluid ACcumulator) by S. Demetriades is known as implementing the method considered above (K. Getland, Space Technology. Illustrated Encyclopedia. Translation from English.—Moscow: Mir, 1986).

A PROFAC apparatus includes an air intake (a receiving device), a componentry liquefaction and separation arrangement, liquefaction arrangement heat dissipaters, a liquid oxygen tank, additional fuel tanks, electric jet (electric rocket) engines, an accelerating engine, a docking unit, a nuclear reactor and reactor's heat dissipaters. When orbiting, PROFAC captures rarefied air near the boundary of dense layers of atmosphere, compresses it by means of gas-dynamic compression in the intake and compressors, cools it off and extracts liquid oxygen. PROFAC uses the remaining nitrogen in a nuclear electric jet engine to provide compensation for losses caused by the aerodynamic drag. The largest part of an external spacecraft surface is occupied by heat dissipaters to dissipate extra heat from a power generating unit, the compressors and the liquefaction arrangement. A standard rocket system is positioned on board the apparatus for transition into a higher orbit in emergency situations and for unloading carried out through the docking unit. PROFAC has got advantages over other known nuclear transport systems so far as it eliminates the necessity to dispose a heavy nuclear reactor on board of apparatus themselves. By estimation of its developers, use of such system can reduce the cost of delivering a cargo to the Moon to $1000 per 1 kg.

In spite of its economic attractiveness, disposition of an active nuclear reactor in an utmost low orbit in upper layers of atmosphere is the main drawback of the PROFAC system. In case if an emergency situation occurs in the nuclear reactor, the system stipulates transition into a higher orbit to repair or bury a defective reactor at a high altitude, however it doesn't guarantee complete safety of earth territories disposed under the orbit of the spacecraft.

Use of a satellite solar power station (SSPS) instead of the nuclear reactor in utmost low orbits is difficult so far as a large area of their members such as solar batteries or focusing mirrors, creates the aerodynamic drag of such a value that the power of the SSPS is not enough to compensate said drag, that makes the system unworkable. Higher orbits are required for efficient usage of solar energy, but a density of raw-material components in this case is so low that exploitation of CSCs turns unprofitable.

As one of possible variants of said disadvantage elimination, let us consider as a prototype method for accumulating atmospheric oxygen and nitrogen with the help of a low-orbit near-earth container spacecraft remotely supplied with power from middle-altitude energy-emitting laser facilities (Ju. M. Es'kov, Environmentally Safe Global Power Industry and Astronautics in XXI Century//Moscow: "Trinitarizm Academy", El 77-6567, publication 14590, Mar. 10, 2007, p. 41-45).

SUMMARY

The system implementing the present method consists of a group of 6 CSCs and 6 continuously functioning middle-altitude energy-emitting space stations (ESSs) forming a regular orbital system of continuous global coverage (at an altitude of 10,000 km) that guarantees continuous power supply of several CSCs in orbits at altitudes of about 105 km. A system for transforming solar radiation energy and transmitting it to a CSC—a satellite solar power station, e.g. an infra-red laser thermally heated by solar radiation, is used as an ESS. The laser is positioned at the focus of an optic system with a large-size solar mirror concentrator.

A container spacecraft comprises: an entrance diffuser (a receiving device), a refrigerator, an arrangement for separating accumulated atmospheric air components, heat dissipaters, storage tanks, a propulsion system (PS), in particular an electric rocket engine (ERE), an accelerating engine, a docking unit. Instead of a nuclear reactor, this system uses a thermal turboelectrorotary electrical converter including a parabolic receiving mirror, a receiving heat exchanger, a turborotary power plant, a panel refrigerator-radiator.

The power system operates as follows. A laser radiation falls to the parabolic receiving mirror continuously tracking a direction to an ESS, is focused on the receiving heat exchanger heating a gaseous working fluid of the closed-loop turborotary power plant. Heat rejection is performed through the typical panel refrigerator-radiator.

The main advantage of the CSC system remotely supplied with power from laser ESSs (in comparison with a CSC supplied with power from a nuclear reactor) consists in provision of environmental safety if an emergency situation occurs.

As for now, application of such systems is impossible because of requiring additional development and creation of high-power space lasers with large power-mass perfection. Besides, disposition of laser ESSs in orbits at altitudes of about 10,000 km substantially increases costs of installing the system in comparison with a variant of its disposition in low orbits.

All CSC systems considered above are designed to collect and accumulate gaseous raw materials from the Earth atmosphere and further to obtain one of fuel components—an oxidant, but the problem of delivering other kinds of raw materials and structural materials and different objects into space is still not solved nevertheless. For example, such component as combustible has to be additionally delivered into an orbit by the traditional expensive method. That is, the problem of fuel reception in the orbit is solved only partially while delivery of other kinds of cargoes by this method is impossible at all.

A technical problem to be solved by the invention is aimed in creation of a method and a system for delivering cargoes into space which widen types of transported cargoes and substantially reduce a specific cost of their delivery into space as well as provide ecological safety of the system realized due to replacement of atmospheric raw materials by cargoes delivered from the surface of the planet, and putting container spacecrafts into higher orbits with disposition of a satellite solar power station thereon.

The indicated technical result is accomplished with the aid of the proposed method and system for delivering cargoes into space.

The method comprises preliminary putting one and more container spacecrafts into an orbit, said one and more container spacecrafts carrying out the capture, accumulation and further transfer of a medium to other spacecrafts, said medium being formed by cargoes disposed on the path of container spacecraft movement. An average altitude of a container spacecraft orbit is defined by a ratio of an aerodynamic drag force and a thrust force of the propulsion system supplied with power from the satellite solar power station. The medium is created artificially on the path of container spacecraft movement for the period necessary for its capture by the container spacecraft and with the help of suborbital spacecrafts releasing the cargoes as single portion or as a plurality of smaller portions consisting of substances having varying chemical compositions and states of aggregation and objects having different geometric forms.

The system realizing the method comprises suborbital aircrafts, a satellite solar power station and a hull of a container spacecraft, comprising a receiving device, heat dissipaters, storage tanks, a docking unit and a propulsion system. At the same time, the container spacecraft additionally comprises a braking medium container connected with an arrangement for separating the cargo and the braking medium and with the receiving device for receiving cargos, which are in form of a cloud of dust particles in solid or drop-liquid state, microcapsules, spheres, containers, as well as in the form of a stream of bars, wires and tapes, while a satellite solar power station is combined with the container spacecraft.

The proposed method consists in preliminary putting at the minimum one CSC equipped with a SSPS into a near-earth orbit. An altitude of the orbit is defined by the possibility of SSPS deployment thereon without occurrence of aerodynamic drag forces exceeding a thrust force of the propulsion system supplied with power from the SSPS. Lift of net load up to the altitude of the CSC movement orbit followed by separation of the cargo in front of the approaching CSC is provided by regular launches of suborbital ground-based aircrafts (minimum one). Suborbital aircrafts form an artificial medium on the CSC movement path, said medium consisting of cargoes having a suborbital speed. This medium is captured through the CSC receiving device (at this moment, a CSC speed is higher than that of the cargo), equalizes the speed in the container with a special braking medium, is accumulated in the storage tanks and is further transferred according to a purpose thereof, in particular it may be partially directed to the PS (propulsion system). Compensation for CSC speed loss because of the cargo capture and the aerodynamic drag is performed by the PS. Both reactive (rocket-type) systems (for example, EREs, heliothermic and thermochemical rocket engines) and non-rocket systems not requiring a working substance, for example an electrodynamic tether system (EDTS) using the Ampere force based on interaction with ionosphere and a magnetic field of a planet for generation of the thrust, can be used as PSs. The proposed method and system for implementation thereof make it possible to transport cargoes consisting of different types of raw materials, structural materials and objects of different types and shapes. Combination of the CSC and the SSPS makes it possible to reduce the project cost and implementation terms substantially due to elimination of the necessity to develop and create the high-altitude orbital SSPS system of continuous global coverage with a laser system for remote power supply to the CSC and thereby to create an arrangement as economically available and quickly realizable as a CSC with a nuclear reactor but environmentally safe.

BRIEF DESCRIPTION OF THE DRAWING

Implementation of the proposed method and system for delivering cargoes into space are schematically presented in FIG. 1a), wherein: 1—container spacecraft; 2—artificial medium (cargoes); 3—spacecrafts (consumers of cargoes); 4—suborbital aircrafts.

The layout of the container spacecraft is presented in FIG. 1b) wherein: 1—container spacecraft hull; 2—receiving device; 3—heat dissipaters; 4—storage tanks; 5—docking unit; 6—propulsion system; 7—braking medium container; 8—arrangement for separating the cargo and the braking medium, 9—satellite solar power station.

DETAILED DESCRIPTION OF THE PREFERRED EMBODIMENTS

The proposed method and systems for delivering cargoes into space are realized as follows.

The container spacecraft 1 combined with the SSPS 9 is inserted into a specified orbit defined in such a way that the thrust force of the PS 6 powered from the SSPS 9 in this orbit is higher than or equal to the sum of a system aerodynamic drag force and a system braking force caused by captured cargoes. Suborbital aircrafts (at least one) with portions of cargoes are launched from a planet, e.g. from the Earth. Both rockets (including single-stage ones), rocket gliders, aerospace planes, and aircrafts casted from the planet surface can be used as suborbital aircrafts. Separation of delivered cargoes from aircrafts is performed in such a way that the cargo meets the CSC receiving device at a design point of the movement path. The method comprises discharging the cargo as both a single portion and a plurality of smaller portions which are distributed along a specified segment of the CSC movement trajectory within a time period that guarantees the capture of said portions by the CSC receiving device. In this way, the cargo having a suborbital speed is captured by the CSC 1 (FIG. 1b), enters the receiving device 2 as a single portion or sequentially as separate portions, and comes into the braking medium container 7 where equalization of the cargo and CSC speeds takes place. As the braking medium can be used different (solid, liquid, gaseous or plasmic state) substances and physical (magnetic, electrical) fields, main function of which is transformation of kinetic energy of cargoes being braked into other types of energy, for example thermal energy. Different gas-dust and gas-drop mixtures, water-, fusible metal- and eutectic alloy-based liquids in the form of jets or streams of foam, other kinds of liquid and solid foams, or disposable replaceable multilayer porous or honeycomb constructions formed (by casting, rolling or stamping) of the substance of previously worked-out constructions directly on board the CSC, can be used as such substances forming the braking medium. Further, the captured cargo enters the arrangement 8 for separating the cargo and the braking medium, where said cargo is pulled out of the braking medium and directed into the storage tanks 4 for preparation to transfer to other spacecrafts (consumers of cargoes), and if necessary, a part of cargoes can be used as the working substance directly on board a CSC. The CSC speed loss because of cargo capture and aerodynamic drag is compensated by the PS 6. In case of using rocket-type PSs, a part of the cargo is consumed to generate a compensating trust. In case of using EDTS, the cargo is not directed to the PS but is completely transferred to other spacecrafts (consumers of cargoes). Extra heat accumulated in the braking medium container 7 in course of cargo capturing is rejected by the heat dissipaters 3. The process of capturing cargoes delivered from a planet surface is regularly repeated until the storage tanks 4 are completely filled in and the accumulated cargo is transferred to the spacecraft (the consumer of cargoes) during docking by means of the docking unit 5. After cargo transfer, the cycle is repeated.

CSCs can move in both circular orbits with uniform supply of cargoes along the whole length of the movement trajectory and in elliptical orbits with supply of cargoes to CSCs only in perigee, followed by accumulation of power by SSPSs in other segments of the orbit. Such a variant is convenient at the stage of step-by-step deploying the SSPS system and carrying out development works in accordance with the CSC project. CSC orbits can be of polar solar-synchronous, equatorial and intermediate types. SSPS panels create the minimal aerodynamic drag to motion due to their edge orientation towards the CSC flight in solar-synchronous orbit. In case if the container spacecraft retreats into the planet shadow when moves in a low near-earth orbit, SSPS panels are either opening so as to minimize the aerodynamic drag or folding up, curling or rolling up.

Use of CSCs for transportation of cargoes from planets is economically more profitable than use of multi-stage rockets, but is limited by a narrow group of substances composing the cargo, while the proposed method and system are widening types of transported cargoes from raw materials to passenger vehicles at substantially less expenses. Not only oxygen as oxidizer but also combustibles, for example hydrogen, lithium, boron, magnesium, aluminum, carbon, silicon, can be delivered into space by the proposed method. As additional group of oxidizers, there will also be possible to deliver such fuel components convenient for long-time storage as water and carbonic acid for a combustible of magnesium and aluminum which simultaneously represent themselves suitable raw materials for production of space construction elements directly in the orbit. Working substances for EREs of inter-orbital and interplanetary tugs, for example argon, krypton, xenon, alkaline metals, can be delivered into space by the same method. The large part of these substances can be supplied into CSC receiving device in containerless form. Solid substances can be supplied in containerless form, for example in the form of a stream, a cloud of dust particles, spheres, bars, wires and tapes. Gases as well as metals can also be delivered in a containerless way in the drop-liquid form or in the form of ice particles. Substances of complicated molecular structures can be placed into protective heat-insulated microcapsules and refractory containers for protection against thermal destruction in course of contacting the braking medium. Radioactive wastes can be delivered in similar containers for the purpose of their further burial in outer space. In perspective, container delivery of cargoes can be used for transportation of both different technical devices and people in those variants of CSCs where a sufficient length of the braking medium container provides an endurable value of accelerations.

The invention claimed is:
1. A method for delivering cargoes into space, comprising:
inserting at least one container spacecraft into an orbit;
launching cargoes using suborbital aircrafts at a suborbital speed, wherein the cargoes being disposed on a movement path of the at least one container spacecraft for a time period necessary for the container spacecraft to capture the cargoes;
capturing cargoes by at least one container spacecraft, accumulating and further transferring said cargoes to other spacecrafts, wherein the cargoes enter a receiving device and further a braking medium container of said at least one container spacecraft sequentially as separate portions in the form of a cloud or stream; and
using a propulsion system of said container spacecraft to compensate for container spacecraft speed losses caused by the cargo capture and an aerodynamic drag, wherein said propulsion system is a reactive type with consumption of a part of the incoming cargoes as a working substance.

2. The method of claim 1, wherein the cargoes are distributed in a plurality of small potions along a specific segment of a container spacecraft movement path to form an artificial medium.

3. The method of claim 1, wherein a further propulsion system is used being an electro-dynamic tethering system powered from a satellite solar power station.

4. A system for delivering cargoes into space, comprising:
suborbital aircrafts to launch cargoes;
a satellite solar power station;
at least one container spacecraft including a receiving device, storage tanks, a braking medium container connected with the receiving device and with an arrangement for separating the cargo and a braking medium;
wherein the cargoes are disposed on a movement path of the at least one container spacecraft as at least one of a cloud of dust particles in a solid or liquid-drop state, microcapsules, spheres, containers, a stream of bars, wires or tapes, and
said at least one container spacecraft further comprises a propulsion system to compensate for container spacecraft speed losses caused by the cargo capture and an aerodynamic drag, whereby said propulsion system is a reactive type with consumption of a part of the incoming cargo as a working substance.

5. The system of claim 4, wherein a further propulsion system is used being an electro-dynamic tethering system powered from said satellite solar power station.

\* \* \* \* \*